UNITED STATES PATENT OFFICE.

HANS KÜZEL, OF HÖCHST, GERMANY, ASSIGNOR TO THE FARBWERKE, VORMALS MEISTER, LUCIUS & BRÜNING, OF SAME PLACE.

YELLOW DYE-STUFF.

SPECIFICATION forming part of Letters Patent No. 484,521, dated October 18, 1892.

Application filed August 3, 1891. Serial No. 401,483. (Specimens.)

*To all whom it may concern:*

Be it known that I, HANS KÜZEL, doctor of philosophy, a citizen of the Empire of Germany, residing at Höchst, in the Empire of Germany, have invented certain new and useful Improvements in the Production of Yellow Dye-Stuff; and I do hereby declare the following to be full, clear, and exact description of the invention, such as will enable others skilled in the art to which it appertains to make and use the same.

In the manufacture of textile fabrics the unreliability of coloring-matters produced from dye-woods, extracts, fustic, berries, flavine, &c., has given place to the employment of artificial coloring-matters which are much more uniform and reliable as to shade and strength, and yet even these latter have not been entirely satisfactory, although their superiority in resisting light and in staying qualities has brought them prominently into use.

In my investigations I have discovered that in the action of diazotized diamido sulphones (Beilstem, 2d edition, vol. 2, p. 525) its homologues and analogues and oxy derivatives and etherized oxy derivatives of these bodies (Annaheim Annalen, 172) upon oxycarbonic acids coloring-matters are formed which when dyed on chromo-mordants possess great fastness against fulling, soap, and light, and with some colors of these series—as, for instance, with the color produced from diazotized diamido sulphone and salicylic acid and the color from diazotized diamido-diethoxy sulphone and salicylic acid—this fastness against fulling, soap, and light is absolutely perfect.

In the production of these coloring-matters the procedure is as follows: For instance, 12.4 parts of diamido-diphenyl sulphone, with the addition of twelve parts of hydrochloric acid, are dissolved in a quantity of water sufficient to give a solution of about ten per cent. For the diazotation of the solution another twelve parts of hydrochloric acid are added, and a solution of 6.9 parts of nitrite in about thirty-five parts of water at a temperature of 10° centigrade. The tetrazo compound thus produced separates from moderately-diluted solutions in amorphous form with dirty-yellow coloration. The tetrazo compound is caused to flow at zero centigrade into about a ten-per-cent. solution composed of sixteen parts orthocresotinic (oxytoline) acid and thirty-three parts of calcined carbonate of soda. The combination sets in immediately and will be complete with certainty at the end of twelve hours. There may be substituted for the carbonate of soda caustic alkali or acetate of sodium. The coloring-matter formed separates to the greatest extent during the operation. After the combination is complete the body is strongly acidulated with hydrochloric acid, and the coloring-matter is filtered off. Being of very difficult solubility, it is best to bring it after it is washed into the form of a paste and make use of it in this form for dyeing and printing.

In a dry state the coloring-matter is an orange-brown powder, of difficult solubility in water, insoluble in chloroform, ligroin, and bisulphide of carbon, soluble in solutions of alkalis, in ether, ethyl and methyl alcohol, and of easiest solubility in acetone. Mordanted wool and cotton—chromo-mordanted stuffs, for instance—it dyes in shades similar to those obtained with yellow dyes, such as fustic, berries, flavine, &c.

The shades produced with the coloring-matter are as fast under the test of fulling and soap as those dyed with yellow dyes, and besides they are superior to the latter in being fast against the action of light.

Metacresotinic acid and salicylic acid may be substituted for the orthocresotinic acid. Paracresotinic acid, metaoxy, paraoxy, and dioxy benzoic acids, oxynaphthoic acids, and oxy and dioxy phthalic acids may also be substituted, but with less perfect results.

For the diamido-diphenyl sulphone there may be substituted the corresponding diamido-diparatolyl sulphone or diamido-diorthotolyl sulphone, and with good results, also, there may be substituted the oxy, methoxy, and ethoxy derivatives of the diamido-diphenyl sulphone and its homologues, as well as the diamido-dinaphthyl sulphones.

Having thus described my invention, what I claim as new, and desire to secure by Letters Patent, is—

As a new article, the coloring-matter derived from diamido-sulphone and oxycarbonic acid, an orange-brown powder difficultly soluble in water, totally insoluble in chloroform, ligroin, bisulphide of carbon, soluble in solutions of alkalies, ether, ethyl and methyl alcohol, and most readily soluble in acetone.

In testimony whereof I affix my signature in the presence of two witnesses.

HANS KÜZEL.

Witnesses:
    JOSEF REVERDY,
    HEINRICH HAHN.